United States Patent [19]

Kronenberg

[11] 3,996,069

[45] * Dec. 7, 1976

[54] NONAQUEOUS CELL UTILIZING A 3ME2OX-BASED ELECTROLYTE

[75] Inventor: Marvin L. Kronenberg, Cleveland Heights, Ohio

[73] Assignee: Union Carbide Corporation, New York, N.Y.

[ * ] Notice: The portion of the term of this patent subsequent to Mar. 18, 1992, has been disclaimed.

[22] Filed: June 30, 1975

[21] Appl. No.: 592,026

[52] U.S. Cl. .................................. 429/197; 429/218
[51] Int. Cl.² .......................................... H01M 6/04
[58] Field of Search ................. 136/154, 6, 13, 155

[56] References Cited

UNITED STATES PATENTS 3,773,558  11/1973  Charbonnier et al. ............ 136/154
3,775,182  11/1973  Patton et al. ......................... 136/13
3,778,310  12/1973  Garth ................................. 136/154
3,871,916  4/1974  Kronenberg .................... 136/6 LN

*Primary Examiner*—Donald L. Walton
*Attorney, Agent, or Firm*—Cornelius F. O'Brien

[57] ABSTRACT

A nonaqueous cell utilizing a highly active metal anode, such as lithium, a solid cathode selected from the group consisting of $FeS_2$, $Co_3O_4$, $V_2O_5$, $Pb_3O_4$, $In_2S_3$ and $CoS_2$, and a liquid organic electrolyte consisting essentially of 3-methyl-2-oxazolidone in combination with a low viscosity cosolvent, such as dioxolane, and a metal salt selected, for example, from the group consisting of $MSCN$, $MCF_3SO_3$, $MBF_4$, $MClO_4$ and $MM'F_6$ wherein M is lithium, sodium or potassium and M' is phosphorus, arsenic or antimony.

16 Claims, No Drawings

NONAQUEOUS CELL UTILIZING A 3ME2OX-BASED ELECTROLYTE

FIELD OF THE INVENTION

This invention relates to a nonaqueous cell utilizing a highly active metal anode, a solid cathode selected from the group consisting of $FeS_2$, $Co_3O_4$, $V_2O_5$, $Pb_3O_4$, $In_2S_3$ and $CoS_2$, and a liquid organic electrolyte based on 3-methyl-2-oxazolidone in conjunction with a low viscosity cosolvent and a selected solute.

BACKGROUND OF THE INVENTION

The development of high energy battery systems requires the compatibility of an electrolyte possessing desirable electrochemical properties with highly reactive anode materials, such as lithium, sodium and the like, and the efficient use of high energy density cathode materials, such as $FeS_2$ and the like. The use of aqueous electrolytes is precluded in these systems since the anode materials are sufficiently active to react with water chemically. It has, therefore, been necessary, in order to realize the high energy density obtainable through use of these highly reactive anodes and high energy density cathodes, to turn to the investigation of nonaqueous electrolyte systems and more particularly to nonaqueous organic electrolyte systems.

The term "nonaqueous organic electrolyte" in the prior art refers to an electrolyte which is composed of a solute, for example, a salt or complex salt of Group I-A, Group II-A or Group III-A elements of the Periodic Table, dissolved in an appropriate nonaqueous organic solvent. Conventional solvents include propylene carbonate, ethylene carbonate or γ-butyrolactone. The term "Periodic Table" as used herein refers to the Periodic Table of the Elements as set forth on the inside back cover of the Handbook of Chemistry and Physics, 48th Edition, The Chemical Rubber Co., Cleveland, Ohio, 1967–1968.

A multitude of solutes is known and recommended for use but the selection of a suitable solvent has been particularly troublesome since many of those solvents which are used to prepare electrolytes sufficiently conductive to permit effective ion migration through the solution are reactive with the highly reactive anodes described above. Most investigators in this area, in search of suitable solvents, have concentrated on aliphatic and aromatic nitrogen- and oxygen-containing compounds with some attention given to organic sulfur-, phosphorus-and arsenic-containing compounds. The results of this search have not been entirely satisfactory since many of the solvents investigated still could not be used effectively with extremely high energy density cathode materials and were sufficiently corrosive to lithium anodes to prevent efficient performance over any length of time.

U.S. Pat. No. 3,547,703 to Blomgren et al. discloses the use of a nonaqueous battery electrolyte employing a solute dissolved in ethylene glycol sulfite.

In an article appearing in Abstracts of the Third International Conference on Nonaqueous Solvents, July 5–7, 1972, Michigan State University, an abstract by H. L. Hoffman, Jr. and P. G. Sears discloses that 3-methyl-2-oxazolidone has been found to be a good nonaqueous solvent because of its ease of synthesis and purification, stability, attractive physical properties, broad dissolving power and coordinating ability. The article mainly related to the disclosure that the basic physical and chemical characteristics of 3-methyl-2-oxazolidone qualified it as a good potential nonaqueous solvent.

U.S. Pat. No. 3,871,916, filed on Apr. 22, 1974 by the same applicant as the subject invention, discloses a nonaqueous cell utilizing a highly active metal anode, a solid $(CF_x)_n$ cathode and a liquid organic electrolyte based on 3-methyl-2-oxazolidone in conjunction with a low viscosity cosolvent and a selected solute, while U.S. application Ser. No. 552,997, filed on Feb. 25, 1975 now U.S. Pat. No. 3,951,685 also by the same applicant as the subject invention, discloses a nonaqueous cell utilizing a highly active metal anode, a sollid CuO cathode and a liquid organic electrolyte based on 3-methyl-2-oxazolidone in conjunction with a low viscosity cosolvent and a selected solute.

While the theoretical energy, i.e., the electrical energy potentially available from a selected anode-cathode couple is relatively easy to calculate, there is a need to choose a nonaqueous electrolyte for such couple that permits the actual energy produced by an assembled battery to approach the theoretical energy. The problem usually encountered is that it is practically impossible to predict in advance how well, if at all, a nonaqueous electrolyte will function with a selected couple. Thus a cell must be considered as a unit having three parts — a cathode, an anode and an electrolyte — and it is to be understood that the parts of one cell are not predictably interchangeable with parts of another cell to produce an efficient and workable cell.

It is an object of the present invention to augment applicant's above-identified inventions by providing a nonaqueous cell which utilizes a highly active metal anode, a solid cathode selected from the group consisting of $FeS_2$, $Co_3O_4$, $V_2O_5$, $Pb_3O_4$, $In_2S_3$ and $CoS_2$, and a liquid organic electrolyte consisting essentially of 3-methyl-2-oxazolidone in combination with a low viscosity cosolvent and a solute.

It is a further object of the invention to provide an electrolyte solvent system for nonaqueous solid cathode cells, i.e., $FeS_2$, $Co_3O_4$, $V_2O_5$, $Pb_3O_4$, $In_2S_3$ and $CoS_2$ cathode cells, which comprises 3-methyl-2-oxazolidone in combination with at least one low viscosity cosolvent and a solute.

It is a further object of this invention to provide a nonaqueous cell which utilizes a highly active metal anode, a cathode selected from the group consisting of $FeS_2$, $Co_3O_4$, $V_2O_5$, $Pb_3O_4$, $In_2S_3$ and $CoS_2$, and a liquid organic electrolyte consisting essentially of 3-methyl-2-oxazolidone in combination with a low viscosity cosolvent and a solute that will yield a cathode efficiency above about 50% and preferably above about 75% during discharge as based on a drain of 1 $mA/cm^2$ to 1.0 volt cutoff using a lithium anode cell.

SUMMARY OF THE INVENTION

The invention provides a novel high energy density nonaqueous cell comprising a highly active metal anode, a solid cathode selected from the group consisting of $FeS_2$, $Co_3O_4$, $V_2O_5$, $Pb_3O_4$, $In_2S_3$ and $CoS_2$, and a liquid organic electrolyte consisting essentially of 3-methyl-2-oxazolidone in combination with at least one low viscosity cosolvent and a conductive solute.

Highly active metal anodes suitable for this invention include lithium (Li), potassium (K), sodium (Na), calcium (Ca), magnesium (Mg) and their alloys. Of these active metals, lithium would be preferred because, in addition to being a ductile, soft metal that can easily be assembled in a cell, it possesses the highest energy-to-weight ratio of the group of suitable anode metals.

The solid cathodes for use in this invention may be made by any suitable method known to those skilled in the battery art. For those cathode materials that have relatively low conductivity, it will be necessary to have a conductive additive mixed with the materials prior to pressing or otherwise molding them into cathode structures. Generally, the cathode materials of this invention can be mixed with a 5 to 10% by weight conductive additive, such as carbon black, and with a 2 to 10% by weight resin binder, such as polytetrafluoroethylene powder, and then pressed into a finished cathode structure having from 7 to 20% by weight combined conductive carbon and binder. U.S. Pat. Nos. 3,639,174, 3,655,585, 3,686,038 and 3,778,310, and British Pat. No. 1,346,890 are cited as being representative of disclosures for making solid cathodes suitable for use in this invention.

Liquid organic 3-methyl-2-oxazolidone material, (3Me2Ox), $\overline{CH_2-CH_2O-CO-N}-CH_3$, is an excellent nonaqueous solvent because of its high dielectric constant, chemical inertness to battery components, wide liquid range and low toxicity.

However, it has been found that when metal salts are dissolved in liquid 3Me2Ox for the purpose of improving the conductivity of 3Me2Ox, the viscosity of the solution becomes too high for its efficient use as an electrolyte for nonaqueous cell applications other than those requiring very low current drains. Thus, in accordance with this invention, the addition of a low viscosity cosolvent is necessary if 3Me2Ox is to be used as an electrolyte for nonaqueous cells which can operate or perform at a high energy density level. Specifically, in order to obtain a high energy density level in accordance with this invention, it is essential to use a solid cathode as specified above along with a highly active metal anode. Thus this invention along with a novel high energy density cell having a highly active metal anode, such as lithium, a solid cathode selected from the group consisting of $FeS_2$, $Co_3O_4$, $V_2O_5$, $Pb_3O_4$, $In_2S_3$ and $CoS_2$ and an electrolyte comprising 3Me2Ox in combination with at least one low viscosity cosolvent and a conductive solute. The cathode efficiency of the subject invention, as based on the percentage of the theoretical capacity of the cathode material available in a cell operating on a drain of 1 milliampere per square centimeter to a 1.0 volt cutoff using a lithium anode, will be above about 50% and preferably above about 75% according to this invention.

The low viscosity cosolvents for use in this invention include tetrahydrofuran (THF), dioxolane, dimethoxyethane (DME), dimethyl isoxazole (DMI), diethyl carbonate (DEC), ethylene glycol sulfite (EGS), dioxane, dimethyl sulfite (DMS), or the like. Tetrahydrofuran and dioxolane are preferred cosolvents because of their compatibility with metal salts dissolved in liquid 3Me2Ox and their chemical inertness to cell components. Specifically,, the total amount of the low viscosity cosolvent added should be between about 20% and about 80% based on total solvent volume, i.e., exclusive of solute, so as to lower the viscosity to a level suitable for use in a cell.

Conductive solutes (metal salts) for use in this invention with the liquid 3Me2Ox may be selected from the group $MCF_3SO_3$, MSCN, $MBF_4$, $MClO_4$ and $MM'F_6$ wherein M is lithium, sodium or potassium, and M' is phosphorus, arsenic or antimony. The addition of the solute is necessary to improve conductivity of 3Me2Ox so that said 3Me2Ox can be used as the electrolyte in nonaqueous cell applications. Thus the particular salt selected has to be compatible and non-reactive with 3Me2Ox and the electrodes of the cell. The amount of solute to be dissolved in the liquid 3Me2Ox should be sufficient to provide good conductivity, e.g., at least about $10^{-4}$ ohm$^{-1}$ cm$^{-1}$. Generally an amount of at least about 0.5 M would be sufficient for most cell applications.

The present invention of a high energy density cell with a 3Me2Ox-based electrolyte, a solid cathode selected from the group recited above and a highly active metal anode will be further illustrated in the following examples.

EXAMPLE I

The viscosity of several samples of 3Me2Ox, with and without a conductive solute and/or a low viscosity cosolvent, were obtained using a Cannon-Fenske viscometer. The data obtained are shown in Table 1 and clearly demonstrate the high viscosity of a solution of 3Me2Ox containing a dissolved conductive solute. As shown in sample 2, when one mole of $LiClO_4$ is added to one liter of 3Me2Ox, the viscosity of the solution was found to be 6.61 centistokes. In sample 6, when one mole of the same metal salt, $LiClO_4$, was added to one liter of equal parts of 3Me2Ox and tetrahydrofuran (THF), the viscosity of the solution was found to be only 2.87. Thus it is clearly shown that the viscosity of a solution of 3Me2Ox and a metal salt can be decreased by the addition of a specifically selected low viscosity cosolvent.

TABLE 1

| Sample | Solvent and Salt | Viscosity (Centistokes) |
| --- | --- | --- |
| 1 | 3Me2Ox; no salt | 2.16 |
| 2 | 3Me2Ox; 1M LiClO | 6.61 |
| 3 | 3Me2Ox; 1M LiBr | 7.58 |
| 4 | 50-50 3Me2Ox, THF; no salt | 1.05 |
| 5 | 50-50 3Me2Ox, THF; 1M LiAsF$_6$ | 3.59 |
| 6 | 50-50 3Me2Ox, THF; 1M LiClO$_4$ | 2.87 |
| 7 | 25-75 3Me2Ox, THF; 1M LiAsF$_6$ | 2.08 |
| 8 | 25-75 3Me2Ox, dioxolane; 1M LiAsF$_6$ | 1.83 |
| 9 | 25-75 3Me2Ox, THF; 1M LiClO$_4$ | 1.99 |

EXAMPLE II

Each of six flat-type cells was constructed utilizing a nickel metal base having therein a shallow depression into which the cell contents were placed and over which a nickel metal cap was placed to close the cell. The contents of each sample cell consisted of a 1.0 inch diameter lithium disc consisting of five sheets of lithium foil having a total thickness of 0.10 inch, about 4 ml of a specific electrolyte as shown in Table 3, a 1.0 inch diameter porous nonwoven polypropylene separator (0.01 inch thick) which absorbed some of the electrolyte, and a solid $FeS_2$ cathode mix compressed onto and into a porous 1.0 inch diameter cathode collector.

The $FeS_2$ electrodes were made of a mixture of $FeS_2$, acetylene black and a polytetrafluoroethylene binder compression-molded onto both sides of a nickel expanded mesh. The $FeS_2$ and acetylene black were first micromilled together, then blended with water, ethanol and a polytetrafluoroethylene emulsion (obtained commercially from Du Pont as Teflon emulsion designated T-30-B) in the proportions shown in Table 2 prior to draining off the excess liquid and compression molding (at 18,000 psi) onto the expanded metal carrier or mesh. Each finished FeS$_2$ electrode contained about 1.9 grams of the cathode mix and had a thickness of about 0.04 inch with a diameter of about 1.0 inch.

89.7%, thus demonstrating that using the teachings of the subject invention efficient, high energy density FeS$_2$ nonaqueous cells can be made.

TABLE 3

| Sample | Electrolyte-Solvent | Electrolyte Salt | Current Density (mA/cm$^2$) | Average Discharge Voltage (Volt) | Theoretical Capacity (mAh) | Average Discharge Capacity to 1.0V Cutoff (mAh) | Cathode Efficiency (%) |
|---|---|---|---|---|---|---|---|
| 1 | 30 vol. % (v/o) 3Me2Ox 70 v/o THF | 2M LiBF$_4$ | 1.0 | 1.24 | 1172 | 855 | 73.0 |
| 2 | 30 v/o 3Me2Ox 40 v/o Dioxolane 30 v/o DME + Trace of DMI | 2M LiAsF$_6$ | 1.0 | 1.20 | 1174 | 810 | 69.0 |
| 3 | & " | 1M LiCF$_3$SO$_3$ | 0.8 | 1.27 | 1168 | 835 | 71.5 |
| 4 | " | 2M LiCF$_3$SO$_3$ | 0.8 | 1.25 | 1178 | 913 | 77.5 |
| 5 | " | 2M LiBF$_4$ | 0.2 | 1.44 | 1194 | 1071 | 89.7 |
| 6 | " | 1M LiBF$_4$ | 0.2 | 1.45 | 1196 | 997 | 83.4 |

TABLE 2

| Materials | Amount | % In Finished Electrode |
|---|---|---|
| FeS$_2$ | 20.0 g | 87.5 |
| "Teflon" emulsion | 2.86 g | 7.5 |
| Acetylene black | 1.14 g | 5.0 |
| Ethanol | 20.0 ml | — |
| H$_2$O | 110.0 ml | — |

The total thickness of the anode, cathode plus cathode collector and separator for each cell measured about 0.15 inch. The average discharge voltage and discharge capacity on various current drains to a 1.0 volt cutoff were obtained for each cell and are shown in Table 3. Since the cells were cathode-limited, the cathode efficiency was calculated as a percentage based on the theoretical capacity of the cathode material available in each cell.

For example, the theoretical efficiency of FeS$_2$ as a cathode material in a lithium anode cell discharging at a 1 milliampere per square centimeter drain to a 1.0 volt cutoff is calculated as follows: Assuming the reaction:

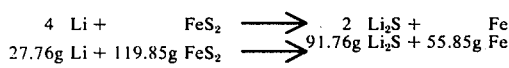

$$4\ Li + FeS_2 \longrightarrow 2\ Li_2S + Fe$$
$$27.76g\ Li + 119.85g\ FeS_2 \longrightarrow 91.76g\ Li_2S + 55.85g\ Fe$$

then if 1 gram (g) FeS$_2$ is used, the fraction of the equivalent weight is 1/29.96. Since one Faraday of electricity is obtained from one equivalent weight, then the AH per equivalent weight is calculated as follows:

$$\frac{96,500\ \text{coulombs/Faraday}}{3600\ \text{coulombs/AH}} = 26.8\ \text{AH/equivalent weight.}$$

Therefore, 1/29.96 equivalent weight × 26.8 AH/equivalent weight = 0.894 AH. This 0.894 AH or 894 mAH is the theoretical capacity of 1 gram of FeS$_2$ material when used as a cathode in a lithium anode cell and by using this value as a reference, the cathode efficiency of FeS$_2$ material can be calculated when used as a cathode in a cell having various electrolytes.

As evidenced by the test data shown in Table 3, the cathode efficiency of the cells ranged from 69.0% to

EXAMPLE III

Three flat type cells were constructed as described in Example II except that the solid cathode was Co$_3$O$_4$ which was made as described in Example II for FeS$_2$ using the proportions shown in Table 4 and the electrolyte employed in each cell is as shown in Table 5.

TABLE 4

| Materials | Amount | % In Finished Electrode |
|---|---|---|
| Co$_3$O$_4$ | 20.0 g | 87.5 |
| "Teflon" emulsion | 2.86 g | 7.5 |
| Acetylene Black | 1.14 g | 5.0 |
| Ethanol | 20.0 ml | — |
| H$_2$O | 110.0 ml | — |

The average discharge voltage and discharge capacity on various current drains to a 1.0 volt cutoff were obtained for each cell and are shown in Table 5.

As in the previous example, the cells were cathode-limited and thus the theoretical efficiency of Co$_3$O$_4$ as a cathode material in a lithium cell discharging at a 1 milliampere per square centimeter drain to a 1.0 volt cutoff is calculated as follows:

Assuming the reaction:

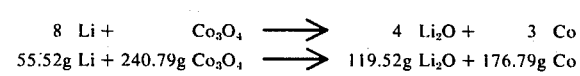

$$8\ Li + Co_3O_4 \longrightarrow 4\ Li_2O + 3\ Co$$
$$55.52g\ Li + 240.79g\ Co_3O_4 \longrightarrow 119.52g\ Li_2O + 176.79g\ Co$$

then if 1 gram (g) Co$_3$O$_4$ is used, the fraction of the equivalent weight is 1/30.1. Since one Faraday of electricity is 26.8 AH/equivalent weight, then 1/30.1 equivalent weight × 26.8 AH/equivalent weight = 0.890 AH. This 0.890 AH or 890 mAH is the theoretical capacity of 1 gram of Co$_3$O$_4$ material when used as a cathode in a lithium anode cell and by using this value as a reference, the cathode efficiency of Co$_3$O$_4$ material can be calculated when used as a cathode in a cell having various electrolytes.

The test data shown in Table 5 wherein the cathode efficiency of the cells ranged from 71.4% to 80.9%, demonstrated that using the teachings of the subject invention, efficient, high energy density Co$_3$O$_4$ nonaqueous cells can be made.

TABLE 5

| Sample | *Electrolyte Salt | Average Discharge Voltage (volt) | Theoretical Capacity (mAh) | Discharge Capacity to 1.00 Cutoff (mAh) | Cathode Efficiency (%) |
|---|---|---|---|---|---|
| 1** | 2 M $LiBF_4$ | 1.08 | 1182 | 844 | 71.4 |
| 2*** | 2 M $LiBF_4$ | 1.15 | 1336 | 1081 | 80.9 |
| 3*** | 1 M $LiCF_3SO_3$ | 1.17 | 1543 | 1195 | 77.4 |

*Electrolyte Solvent
 30 vol % (v/o)
 40 v/o Dioxolane
 30 v/o DME
 Trace of DMI
**Current density 0.8 mA/cm²
***Current density 0.2 mA/cm²

EXAMPLE IV

Two flat type cells were constructed as described in Example II except that the solid cathode was $V_2O_5$ which was made as described in Example II for $FeS_2$ using the proportions shown in Table 6 and the electrolyte employed in each cell is as shown in Table 7.

TABLE 6

| Materials | Amount | % In Finished Electrode |
|---|---|---|
| $V_2O_5$ | 20.0 g | 87.5 |
| "Teflon" emulsion | 2.86 g | 7.5 |
| Acetylene Black | 1.14 g | 5.0 |
| Ethanol | 20.0 ml | — |
| $H_2O$ | 110.0 ml | — |

The average discharge voltage and discharge capacity on a 0.8 milliampere per square centimeter drain to a 1.0 volt cutoff were obtained for each cell and are shown in Table 7.

As in the previous examples, the cells were cathode-limited and thus the theoretical efficiency of $V_2O_5$ as a cathode material in a lithium cell discharging at a 1 milliampere per square centimeter drain to a 1.0 volt cutoff is calculated as follows:

Assuming the reaction:

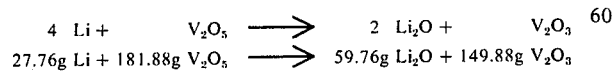

$$4\ Li + V_2O_5 \longrightarrow 2\ Li_2O + V_2O_3$$
$$27.76g\ Li + 181.88g\ V_2O_5 \longrightarrow 59.76g\ Li_2O + 149.88g\ V_2O_3$$

then if 1 gram (g) $V_2O_5$ is used, the fraction of the equivalent weight is 1/45.47. Since one Faraday of electricity is 26.8 AH/equivalent weight, then 1/45.47 equivalent weight × 26.8 AH/equivalent weight = 0.589 AH. This 0.589 AH or 589 mAH is the theoretical capacity of 1 gram of $V_2O_5$ material when used as a cathode in a lithium anode cell and by using this value as a reference, the cathode efficiency of $V_2O_5$ material can be calculated when used as a cathode in a cell having various electrolytes.

The test data shown in Table 7 wherein the cathode efficiency of the cells varied between 68.4% and 67.6% demonstrated that using the teachings of the subject invention, efficient, high energy density $V_2O_5$ nonaqueous cells can be made.

TABLE 7

| Sample | Electrolyte | Average Discharge Voltage (volt) | Theoretical Capacity (mAh) | Discharge Capacity to 1.0 Volt Cutoff (mAh) | Cathode Efficiency (%) |
|---|---|---|---|---|---|
| 1* | 1M $LiCF_3SO_3$ in 30 v/o 3Me2Ox 40 v/o Dioxolane 30 v/o DME Trace of DMI | 1.90 | 500 | 342 | 68.4 |
| 2* | 2M $LiCF_3SO_3$ in 50 v/o 3Me2Ox 50 v/o Dioxolane | 1.70 | 503 | 340 | 67.6 |

*Current density 0.8 mA/cm²

EXAMPLE V

Three flat type cells were constructed as described in Example II except that the solid cathode was $Pb_3O_4$ which was made as described in Example II for $FeS_2$ using the proportions shown in Table 8 and the electrolyte employed in each cell is as shown in Table 9.

TABLE 8

| Sample | Materials | Amount | % In Finished Electrode |
|---|---|---|---|
| 1 and 2 | $Pb_3O_4$ | 30.0 g | 92 |
| | "Teflon" emulsion | 1.63 g | 3 |
| | Acetylene Black | 1.63 g | 5 |
| | Ethanol | 30 ml | — |
| | $H_2O$ | 110.0 ml | — |
| 3 | $Pb_3O_4$ | 30.0 g | 92 |
| | "Teflon" emulsion | 1.63 g | 3 |
| | Lead Powder | 1.63 g | 5 |
| | Ethanol | 30.0 ml | — |
| | $H_2O$ | 110.0 ml | — |

The average discharge voltage and discharge capacity on various current drains to a 1.0 volt cutoff were obtained for each cell and are shown in Table 9.

As in the previous examples, the cells were cathode-limited and thus the theoretical efficiency of $Pb_3O_4$ as a cathode material in a lithium cell discharging at a 1 milliampere per square centimeter drain to a 1.0 volt cutoff is calculated as follows:

Assuming the reaction:

$$8\text{ Li} + \text{Pb}_3\text{O}_4 \longrightarrow 4\text{ Li}_2\text{O} + 3\text{ Pb}$$
$$55.52\text{g Li} + 685.57\text{g Pb}_3\text{O}_4 \longrightarrow 119.52\text{g Li}_2\text{O} + 621.57\text{g Pb}$$

then if 1 gram (g) $Pb_3O_4$ is used, the fraction of the equivalent weight is 1/85.7. Since one Faraday of electricity is 26.8 AH/equivalent weight then 1/85.7 equivalent weight × 26.8 AH/equivalent weight = 0.312 AH. This 0.312 AH or 312 mAH is the theoretical capacity of 1 gram of $Pb_3O_4$ material when used as a cathode in a lithium anode cell and by using this value as a reference, the cathode efficiency of $Pb_3O_4$ material can be calculated when used as a cathode in a cell having various electrolytes.

The test data shown in Table 9 wherein the cathode efficiency of the cells ranged from 72.5% to 99.8%, demonstrated that using the teachings of the subject invention, efficient, high energy density $Pb_3O_4$ nonaqueous cells can be made.

TABLE 9

| Sample | Electrolyte | Average Discharge Voltage (volt) | Theoretical Capacity (mAh) | Discharge Capacity to 1.0 volt Cutoff | Cathode Efficiency (%) |
| --- | --- | --- | --- | --- | --- |
| 1* | 1M LiCF$_3$SO$_3$ in 30 v/o 3Me2Ox 40 v/o Dioxolane 30 v/o DME | 1.39 | 563 | 562 | 99.8 |
| 2* | 1M LiBF$_4$ in 50 v/o 3Me2Ox 50 v/o Trimethyl phosphite | 1.38 | 563 | 550 | 97.7 |
| 3** | 1M LiCF$_3$SO$_3$ in 30 v/o 3Me2Ox 40 v/o Dioxolane 30 v/o DME Trace DMI | 1.19 | 792 | 574 | 72.5 |

*Current density 0.2 mA/cm$^2$
**Current density 0.8 mA/cm$^2$

EXAMPLE VI

Two flat type cells were constructed as described in Example II except that the solid cathode was $In_2S_3$ which was made as described in Example II for $FeS_2$ using the proportions shown in Table 10 and the electrolyte employed in each cell is as shown in Table 11.

TABLE 10

| Materials | Amount | % In Finished Electrode |
| --- | --- | --- |
| In$_2$S$_3$ | 20.0 g | 87.5 |
| "Teflon" emulsion | 2.86 g | 7.5 |
| Acetylene Black | 1.14 g | 5.0 |
| Ethanol | 20.0 ml | — |
| H$_2$O | 110.0 ml | — |

The average discharge voltage and discharge capacity on a 0.2 milliampere per square centimeter drain to a 1.0 volt cutoff were obtained for each cell and are shown in Table 11.

As in the previous examples, the cells were cathode-limited and thus the theoretical efficiency of $In_2S_3$ as a cathode material in a lithium cell discharging at a 1 milliampere per square centimeter drain to a 1.0 volt cutoff is calculated as follows:
Assuming the reaction:

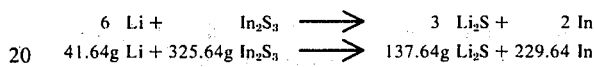

$$6\text{ Li} + \text{In}_2\text{S}_3 \longrightarrow 3\text{ Li}_2\text{S} + 2\text{ In}$$
$$41.64\text{g Li} + 325.64\text{g In}_2\text{S}_3 \longrightarrow 137.64\text{g Li}_2\text{S} + 229.64\text{ In}$$

then if 1 gram (g) $In_2S_3$ is used, the fraction of the equivalent weight is 1/54.27. Since the Faraday of electricity is 26.8 AH/equivalent weight, then 1/54.27 equivalent weight × 26.8 AH/equivalent weight = 0.494 AH. This 0.494 AH or 494 mAH is the theoretical capacity of 1 gram of $In_2S_3$ material when used as a cathode in a lithium anode cell and by using this value as a reference, the cathode efficiency of $In_2S_3$ material can be calculated when used as a cathode in a cell having various electrolytes.

The test data shown in Table 11 wherein the cathode efficiency of the cells varied between 59% and 95%, demonstrated that using the teachings of the subject invention, efficient, high energy density $In_2S_3$ nonaqueous cells can be made.

TABLE 11

| Sample | Electrolyte | Average Discharge Voltage (volt) | Theoretical Capacity (mAh) | Discharge Capacity to 1.0 Volt Cutoff (mAh) | Cathode Efficiency (%) |
| --- | --- | --- | --- | --- | --- |
| 1* | 2M LiBF$_4$ in 30 v/o 3Me2Ox 40 v/o Dioxolane | 1.30 | 522 | 496 | 95 |

TABLE 11-continued

| Sample | Electrolyte | Average Discharge Voltage (volt) | Theoretical Capacity (mAh) | Discharge Capacity to 1.0 Volt Cutoff (mAh) | Cathode Efficiency (%) |
|---|---|---|---|---|---|
| 2* | 1M LiCF$_3$SO$_3$ in 30 v/o 3Me2Ox 40 v/o Dioxolane 30 v/o DME Trace DMI | 1.34 | 516 | 304 | 59 |

*Current density 0.2 mA/cm$^2$

EXAMPLE VII

Four flat cells were constructed as described in Example II except that the solid cathode was CoS$_2$ which was made as described in Example II for FeS$_2$ using the proportions shown in Table 12 and the electrolyte employed in each cell is as shown in Table 13.

TABLE 12

| Materials | Amount | % In Finished Electrode |
|---|---|---|
| CoS$_2$ | 20.0 g | 84.70 |
| "Teflon" emulsion | 1.63 g | 6.91 |
| Acetylene Black | 1.98 g | 8.39 |
| Ethanol | 20.0 ml | — |
| H$_2$O | 110.0 ml | — |

The average discharge voltage and discharge capacity on a 0.2 or a 0.8 milliampere per square centimeter drain to a 1.0 volt cutoff were obtained for each cell and are shown in Table 13.

As in the previous examples, the cells were cathode-limited and thus the theoretical efficiency of CoS$_2$ as a cathode material in a lithium cell discharging at a 1 milliampere per square centimeter drain to a 1.0 volt cutoff is calculated as follows:

Assuming the reaction:

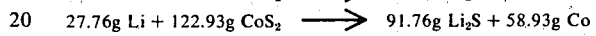

$$4\ Li + CoS_2 \longrightarrow 2\ Li_2S + Co$$
$$27.76g\ Li + 122.93g\ CoS_2 \longrightarrow 91.76g\ Li_2S + 58.93g\ Co$$

then if 1 gram (g) CoS$_2$ is used, the fraction of the equivalent weight is 1/30.73. Since one Faraday of electricity is 26.8 AH/equivalent weight, then 1/30.73 equivalent weight × 26.8 AH/equivalent weight = 0.872 AH. This 0.872 AH or 872 mAH is the theoretical capacity of 1 gram of CoS$_2$ material when used as a cathode in a lithium anode cell and by using this value as a reference, the cathode efficiency of CoS$_2$ material can be calculated when used as a cathode in a cell having various electrolytes.

The test data shown in Table 13 wherein the cathode efficiency of the cells varied between 86.8% and 93.5% demonstrated that using the teachings of the subject invention, efficient, high energy density CoS$_2$ nonaqueous cells can be made.

TABLE 12

| Sample | Electrolyte | Average Discharge Voltage (volt) | Theoretical Capacity (mAh) | Discharge Capacity to 1.0 or 1.2 volt Cutoff | Cathode Efficiency (%) |
|---|---|---|---|---|---|
| 1* | 2M LiBF$_4$ in 30 v/o 3Me2Ox 40 v/o Dioxolane 30 v/o DME Trace DMI | 1.48 | 633 | 592 (1.2 V cutoff) | 93.5 |
| 2** | Same as No.1 | 1.37 | 643 | 588 (1.0 V cutoff) | 91.4 |
| 3* | 1M LiCF$_3$SO$_3$ 30 v/o 3Me2Ox 40 v/o Dioxolane 30 v/o DME Trace DMI | 1.48 | 682 | 592 (1.2 V cutoff) | 86.8 |
| 4** | Same as No. 3 | 1.33 | 635 | 560 (1.0 V cutoff) | 88.2 |

*Current density 0.2 mA/cm$^2$
**Current density 0.8 mA/cm$^2$

While the present invention has been described with reference to many particular details thereof, it is not intended that these details shall be construed as limiting the scope of this invention.

What is claimed is:

1. A nonaqueous cell comprising a highly active metal anode, a solid cathode selected from the group consisting of FeS$_2$, Co$_3$O$_4$, V$_2$O$_5$, Pb$_3$O$_4$, In$_2$S$_3$ and CoS$_2$, and a liquid organic electrolyte consisting essentially of 3-methyl-2-oxazolidone in combination with at least one low viscosity cosolvent and a conductive solute.

2. The nonaqueous cell of claim 1 wherein said low viscosity solvent is selected from the group consisting of tetrahydrofuran, dioxolane, dimethoxyethane, dimethyl isoxazole, diethyl carbonate, ethylene glycol sulfite, dioxane and dimethyl sulfite.

3. The nonaqueous cell of claim 1 wherein said conductive solute is selected from the group consisting of $MCF_3SO_3$, MSCN, $MBF_4$, $MClO_4$ and $MM'F_6$ wherein M is lithium, sodium or potassium and M' is phosphorus, arsenic or antimony.

4. The nonaqueous cell of claim 1 wherein said active metal anode is selected from the group consisting of lithium, potassium, sodium, calcium, magnesium and alloys thereof.

5. The nonaqueous cell of claim 2 wherein said conductive solute is selected from the group consisting of MSCN, $MCF_3SO_3$, $MBF_4$, $MClO_4$ and $MM'F_6$ wherein M is lithium, sodium or potassium and M' is phosphorus, arsenic or antimony.

6. The nonaqueous cell of claim 3 wherein said low viscosity cosolvent is selected from the group consisting of tetrahydrofuran, dioxolane, dimethoxyethane, dimethyl isoxazole, diethyl carbonate, ethylene glycol sulfite, dioxane and dimethyl sulfite.

7. The nonaqueous cell of claim 5 wherein said active metal anode is selected from the group consisting of lithium, potassium, sodium, calcium, magnesium and alloys thereof.

8. The nonaqueous cell of claim 6 wherein said active metal anode is selected from the group consisting of lithium, potassium, sodium, calcium, magnesium and alloys thereof.

9. The nonaqueous cell of claim 1 wherein said active metal anode is lithium, said low viscosity cosolvent is tetrahydrofuran, and said conductive solute is selected from the group consisting of $LiBF_4$, $LiClO_4$ and $LiCF_3SO_3$.

10. The nonaqueous cell of claim 1 wherein said active metal anode is lithium, said low viscosity cosolvent is dioxolane, and said conductive solute is selected from the group consisting of $LiBF_4$, $LiClO_4$ and $LiCH_3SO_3$.

11. The nonaqueous cell of claim 7 wherein said solid cathode is $FeS_2$.

12. The nonaqueous cell of claim 7 wherein said solid cathode is $Co_3O_4$.

13. The nonaqueous cell of claim 7 wherein said solid cathode is $V_2O_5$.

14. The nonaqueous cell of claim 7 wherein said solid cathode is $Pb_3O_4$.

15. The nonaqueous cell of claim 7 wherein said solid cathode is $In_2S_3$.

16. The nonaqueous cell of claim 7 wherein said solid cathode is $CoS_2$.

* * * * *

UNITED STATES PATENT OFFICE
CERTIFICATE OF CORRECTION

Patent No. 3,996,069                    Dated December 7, 1976

Inventor(s) Marvin L. Kronenberg

It is certified that error appears in the above-identified patent and that said Letters Patent are hereby corrected as shown below:

Column 14, lines 15 and 16, "Li$\underline{CF}_3$SO$_3$" should read ---- Li$\underline{CH}_3$SO$_3$ ----.

Signed and Sealed this

*Twenty-fourth* Day of *October 1978*

[SEAL]

Attest:

RUTH C. MASON
*Attesting Officer*

DONALD W. BANNER
*Commissioner of Patents and Trademarks*